(12) United States Patent
Punwani et al.

(10) Patent No.: US 9,641,694 B2
(45) Date of Patent: May 2, 2017

(54) COMMUNICATIONS SYSTEM

(71) Applicant: BRITISH TELECOMMUNICATIONS public limited company, London (GB)

(72) Inventors: Mohit Punwani, London (GB); Martin Gibson Kell, London (GB); Colin John Canavan, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 14/780,852

(22) PCT Filed: Feb. 14, 2014

(86) PCT No.: PCT/GB2014/000052
§ 371 (c)(1),
(2) Date: Sep. 28, 2015

(87) PCT Pub. No.: WO2014/155030
PCT Pub. Date: Oct. 2, 2014

(65) Prior Publication Data
US 2016/0057290 A1  Feb. 25, 2016

(30) Foreign Application Priority Data
Mar. 26, 2013  (EP) .................... 13250036

(51) Int. Cl.
*H04Q 7/10* (2006.01)
*H04M 15/00* (2006.01)
(Continued)

(52) U.S. Cl.
CPC ........ *H04M 15/56* (2013.01); *H04L 65/1069* (2013.01); *H04W 4/003* (2013.01);
(Continued)

(58) Field of Classification Search
CPC ......... H04M 15/56; H04W 4/24; H04W 4/16; H04W 76/04; H04W 4/14
(Continued)

(56) References Cited

U.S. PATENT DOCUMENTS 6,301,480 B1 * 10/2001 Kennedy, III ...... H04W 76/021
455/445
8,588,389 B2 * 11/2013 Citron ............... H04L 29/06027
370/352
(Continued)

FOREIGN PATENT DOCUMENTS

WO   WO 2008/027065 A1   3/2008

OTHER PUBLICATIONS

PCT International Search Report for PCT/GB2014/000052, mailed Mar. 20, 2014, 3 pages.
(Continued)

*Primary Examiner* — Ajit Patel
*Assistant Examiner* — Julio Perez
(74) *Attorney, Agent, or Firm* — Patterson Thuente Pedersen, P.A.

(57) ABSTRACT

A method for initiating a call in a communications system comprising a mobile communications device connected in a mobile communications network. The mobile communications device is allocated a mobile identifier for a first, mobile communications service provided by a mobile communications service provider and is allocated a second identifier for a second communications service provided by a second communications service provider that is different from the first, mobile communications service. The method comprises receiving over a data connection, at a switch, a request from the mobile communications device, comprising the second identifier, to initiate a call using the second communications service and adding, at the switch, the mobile
(Continued)

identifier to the request and forwarding via a further network, the request comprising both the second identifier and the mobile identifier.

12 Claims, 9 Drawing Sheets

(51) Int. Cl.
    *H04W 60/00*     (2009.01)
    *H04W 4/00*     (2009.01)
    *H04L 29/06*     (2006.01)
    *H04W 4/16*     (2009.01)
    *H04W 4/24*     (2009.01)
    *H04W 76/02*     (2009.01)
    *H04W 88/14*     (2009.01)

(52) U.S. Cl.
    CPC ............... *H04W 4/16* (2013.01); *H04W 4/24* (2013.01); *H04W 60/005* (2013.01); *H04W 76/02* (2013.01); *H04W 88/14* (2013.01)

(58) Field of Classification Search
    USPC ............... 455/406, 408, 414.1; 370/352, 353
    See application file for complete search history.

(56) References Cited

U.S. PATENT DOCUMENTS

| | | | |
|---|---|---|---|
| 2002/0127995 A1 | 9/2002 | Faccinn et al. | |
| 2009/0168757 A1* | 7/2009 | Bush | H04M 7/0057 370/352 |
| 2011/0065426 A1 | 3/2011 | Bae et al. | |
| 2012/0131116 A1* | 5/2012 | Tu | H04L 63/101 709/206 |
| 2016/0043953 A1 | 2/2016 | Ringland | |
| 2016/0066227 A1 | 3/2016 | Townend | |

OTHER PUBLICATIONS

PCT International Preliminary Report on Patentability for PCT/GB2014/000052, dated Jun. 29, 2015, 7 pages.

Wei-Zu Yang et al: "The Design of Multimedia Web-based Phone and Billing System with Freeware over the VoIP Network", Sensor Networks, Ubiquitous, and Trustworthy Computing, 2006. IEEE Int Ernational Conference on Taichung, Taiwan Jun. 5-7 2005, Piscataway, NJ, USA,IEEE, vol. 1, Jun. 5, 2006 (Jun. 5, 2006), pp. 298-301, XP010919154, DOI: 10.1109/SUTC.2006.1636190 ISBN: 978-0-7695-2553-2.

\* cited by examiner

Figure 2e

Password (at least 8 numbers and letters)
******

Weak password ******
Your password must be at least 8 characters long and contain a mix of numbers, letters or charachers
: '@º$#^€`;) _ -.=:;0. . -)

Confirm password

Security question
We'll ask you this security question if you lose your password.

Mother's maiden name?
Johnson —— 236

By logging in to bt.com, you're agreeing to the BT SmartTalk terms and conditions Next

..ıll CARRIER 3G  4:20 PM
Creat bt.com login

About you
Mr
John —— 232
Smith —— 234

Log-in details
Email address (this will be your username)
john.smith@johnsmithcompany.co.uk
john.smith@johnsmithcompany.co.uk

..ıll CARRIER 3G  4:20 PM
Cancel  Enter bt.com log-in details

To complete your request enter the bt com log-in details that you used when you set up BT SmartTalk fredflintstone@yabbadabbado.com
**********

Enter

I can't remember my details

220

COMMUNICATIONS SYSTEM

RELATED APPLICATIONS

The present application is a National Phase entry of PCT Application No. PCT/GB2014/000052, filed Feb. 14, 2014, which claims priority to EP 13250036.4, filed Mar. 26, 2013, the contents of which are incorporated herein by reference in their entireties.

TECHNICAL FIELD

Embodiments relate to initiating calls in a communications system.

BACKGROUND

US2011065426 describes a method of displaying caller ID in a WiMAX/GSM integrated support portable terminal. In particular, US2011065426 describes initiating a VoIP call in a mobile network. WO2008027065 describes initiating a VoIP call in a mobile network in which a temporary directory number is associated with the VoIP destination device.

SUMMARY

A method for initiating a call in a communications system comprising a mobile communications device connected in a mobile communications network. The mobile communications device is allocated an identifier for a mobile communications service provided by a mobile communications service provider and is allocated an identifier for a second communications service provided by a second communications service provider that is different from the mobile communications service. The method comprises receiving, at a switch (e.g. a softswitch operating on a hardware server), from the mobile communications device, a request, comprising the second identifier, to initiate a call. The method comprises adding the mobile identifier to the received request at the switch and forwarding to a communications service provider the request comprising both the second identifier and the mobile identifier.

Use of the SIP/VoIP service may be linked to another account for billing purposes, e.g. so that call charges are not accrued to a mobile communications billing account. Advantageously, high-rate mobile call charges may be avoided by use of the data connection to make calls and by billing these to a non-mobile account. A method is provided for associating charges incurred using the second communications service (e.g. SIP/VoIP) with a billing account for a different, third communications service. The mobile communications device is associated with a mobile communications service billing account. A charge relating to the call using the second, SIP/VoIP communications service is allocated to a billing account for the third communications service. Charges for SIP/VoIP calls from the mobile phone may then be charged to a telephone account associated with a different communications device and a different communications service, e.g. the user's home phone line.

Where the second identifier may not allow calls to be routed back to the user's mobile device (e.g. where it is a non-geographic number), inclusion in the request, of the user's mobile identifier advantageously enables the recipient of the call to use the mobile number to contact the user and, possibly, to also identify the caller.

The mobile communications device may be operable in both a mobile telephony network and a data (IP) network. A SIP/VoIP call over the data network from the mobile phone is associated with a SIP ID and, additionally, is tagged at a softswitch or other server handling the SIP/VoIP call with the phone's mobile number, e.g. in the form of a presentation number. When the softswitch forwards the call (e.g. to the PSTN), a phone receiving the SIP/VoIP-originated call is able to identify the calling party's mobile number and is able, as a result, to contact the calling party by using the calling party's mobile number. In order to facilitate handling by the softswitch of the mobile phone's SIP ID, this may be set to an unallocated non-geographic telephone number.

To enable the mobile device to operate according embodiments to the invention, the user may download an app from a suitable app website. The app initiates a VoIP account set up process with a communications provider.

A billing arrangement may be set up by receiving, from a mobile communications device, a request to set up, with a third communications service provider, a billing account for the second communications service. Allocating an identifier to the billing account with the third communications service provider and associating the identifier with the mobile communications device.

A switch comprises: first and second communications interfaces. The first communications interface is for communicating over a data connection with a mobile communications device connected in a mobile communications network. The mobile communications device is allocated an identifier for a mobile communications service provided by a mobile communications service provider and a second identifier for a second communications service. The second communications interface is for communicating with a further communications network. The switch also comprises a processor configured to control operation of the switch. The processor controls operation of the switch to receive via the first communications interface, a request from the mobile communications device to initiate a call using the second communications service; in which the received request comprises the second identifier. The processor also controls operation of the switch to add the mobile identifier to the received request and forward, via the second communications interface to the further communications network, the request comprising both the second identifier and the mobile identifier.

A communications system comprising the above switch.

BRIEF DESCRIPTION OF THE DRAWINGS

In order to aid understanding, embodiments will now be described by way of example with reference to the drawings in which.

DETAILED DESCRIPTION

Some embodiments cover aspects of the SmartTalk service offered by British Telecommunications plc of 81 Newgate Street, London EC1A 7AJ, United Kingdom (BT), although embodiments are not limited thereto, SmartTalk is aimed at users of a communications service provided to a mobile device and allows linkage of a customer's mobile phone with their home phone calling plan.

According to an embodiment, the system may allocate to a mobile communications device, a non-geographic telephone number (e.g. 03 number) as unique identifier (UI) for a second communications service (for example, one based on session initiation protocol SIP) accessible from the mobile device. The UI is dedicated to the user of the mobile device and, where an app is provided on the mobile device to manage the second communications service, the UI for the second communications service (e.g. a non-geographic number) is allocated to the app running on the mobile device. There is no requirement for the UI to also be associated with the mobile communications service that is also accessed from the mobile device. Where the app manages the second communications service from the mobile device, conventional software may be provided on the mobile device to manage the mobile communications service.

Whereas a mobile communications service, e.g. a mobile telephony service, is normally linked to an account with a provider of the mobile communications service (e.g. to provide for billing for use of the mobile communications service), embodiments enable a user to additionally link with a third account (i.e. through a service identifier) a second communications service accessed directly from their mobile device. The third account (referred to herein as the "home" account) is an account with a provider of a third communications service. The UI for the second communications service is then associated with the third service. For example, to accept charges for use of a SIP/VoIP communications service, the UI for the SIP/VoIP communications service may be associated with a home phone line account.

The third communications service may be provided by a different service provider to the service providers for the mobile and second communications services. The third communications service may be associated with a home telephony service, for example, a landline telephone service supplied to the user's residence but may, according to a further embodiment, be associated with a provider of another kind of communications service. The home telephony service may be registered to the mobile communications service user (hereafter "mobile user") or to another person but where the mobile user has access to the home telephony service. For example, the home telephony service may be assigned to a first family member where the mobile user is another member of the same family, sharing the same residence to which the home telephony service is provided.

Figure 1:
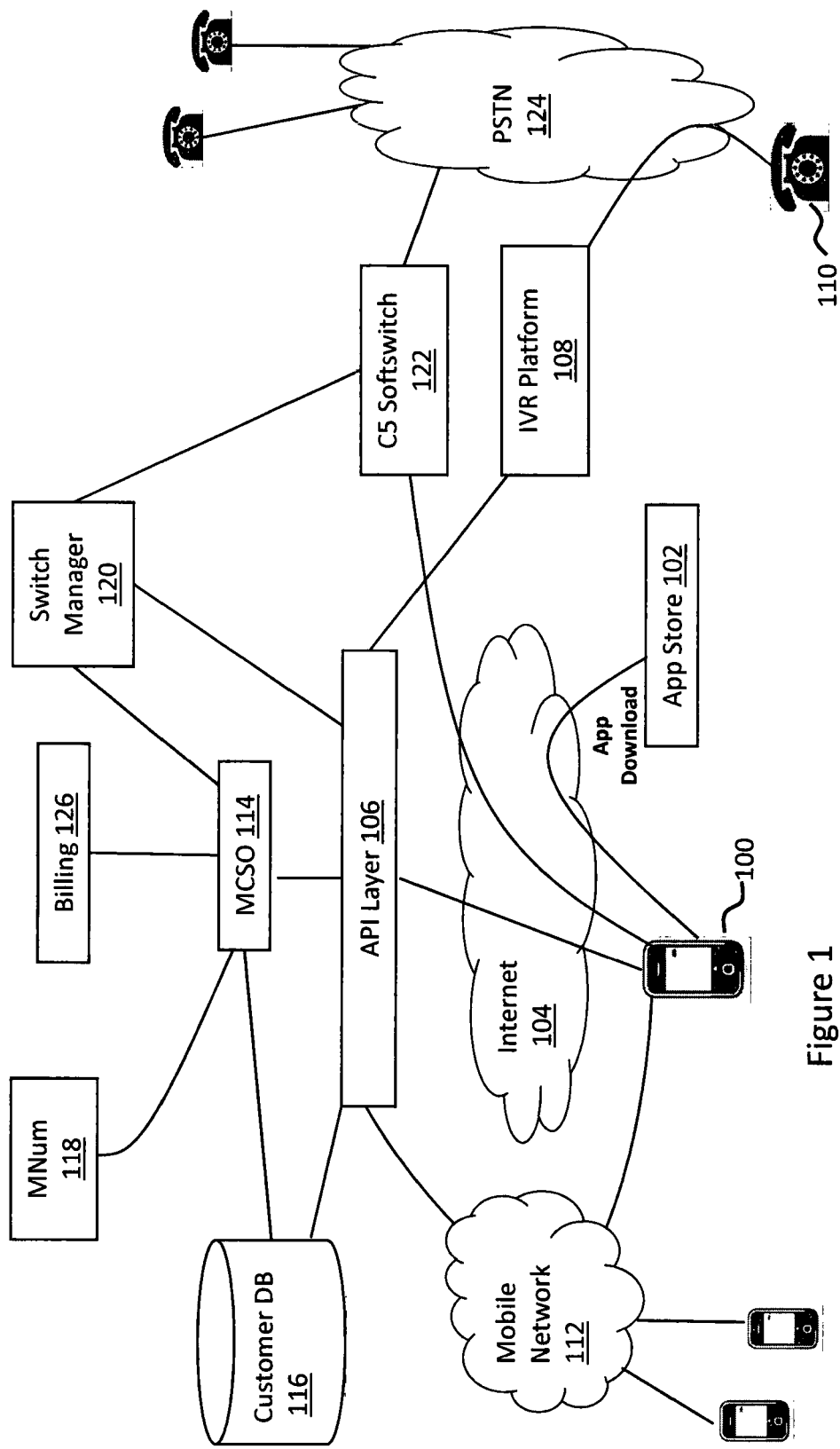
FIG. 1 shows in schematic form a system for implementing an embodiment.

FIG. 1 shows in schematic form, a system for implementing an embodiment. In the system of FIG. 1, a user (not shown), i.e. a consumer of telephone services, operates mobile communications device 100, which may be a smart phone, tablet, laptop computer or other network-enabled mobile device. The user may operate mobile communications device 100 to communicate via mobile telephone network 112 with telephony terminal devices via one or more communications service provider network. The user may also operate mobile communications device 100 to communicate over a data connection via Internet 104 with web servers, such as application provider website 102, integrated voice response (IVR) platform 108 and Softswitch 122. The data connection may be set up over Wi-Fi or a mobile data connection. Mobile communications device 100 is allocated an identifier (the "mobile identifier"), e.g. a mobile telephone number, for a mobile communications service provided by a mobile communications service provider.

As part of a process of registering for a new communications service or configuration of an existing communications service, the user may also operate mobile communications device 100 to communicate over Internet 104 with servers operated by a communications service provider, such as API Layer application 106, operated by British Telecommunications plc. Mobile communications device 100 is also allocated an identifier (the "second identifier") for a second communications service, e.g. a. UI for a SIP/VoIP communications service provided by a second communications service provider that is different from the mobile communications service. As indicated, above, this second identifier may, according to an embodiment, be a non-geographic number.

API Layer application 106 provides an interface for the user to the internal systems operated by the communications service provider. As shown in FIG. 1, these internal systems comprise customer order software function (MCSO) 114, customer database server 116, phone number repository (MNUM) 118, switch manger 120 and billing platform 126.

In order to provide the service in a secure manner, a user may be required to register with the service provider. To initiate registration, the user may download from a suitable application provider website 102 to their mobile device 100 an application (or app) supporting an embodiment. Suitable application provider websites will include the Apple iTunes® store and the Android™ Marketplace/Google® Play website. Once downloaded, the user launches the app on mobile device 100, which sets up a connection (such as TCP/IP) via Internet 104 with API Layer application 106. The app guides the user through a registration journey (described below—see screens-shots FIGS. 2a to 2n and signal flow diagrams FIGS. 3a, 3b). The registration journey comprises an exchange of information between the app and the API Layer application 106, which runs on a server-based hardware platform (not shown).

Figure 5:
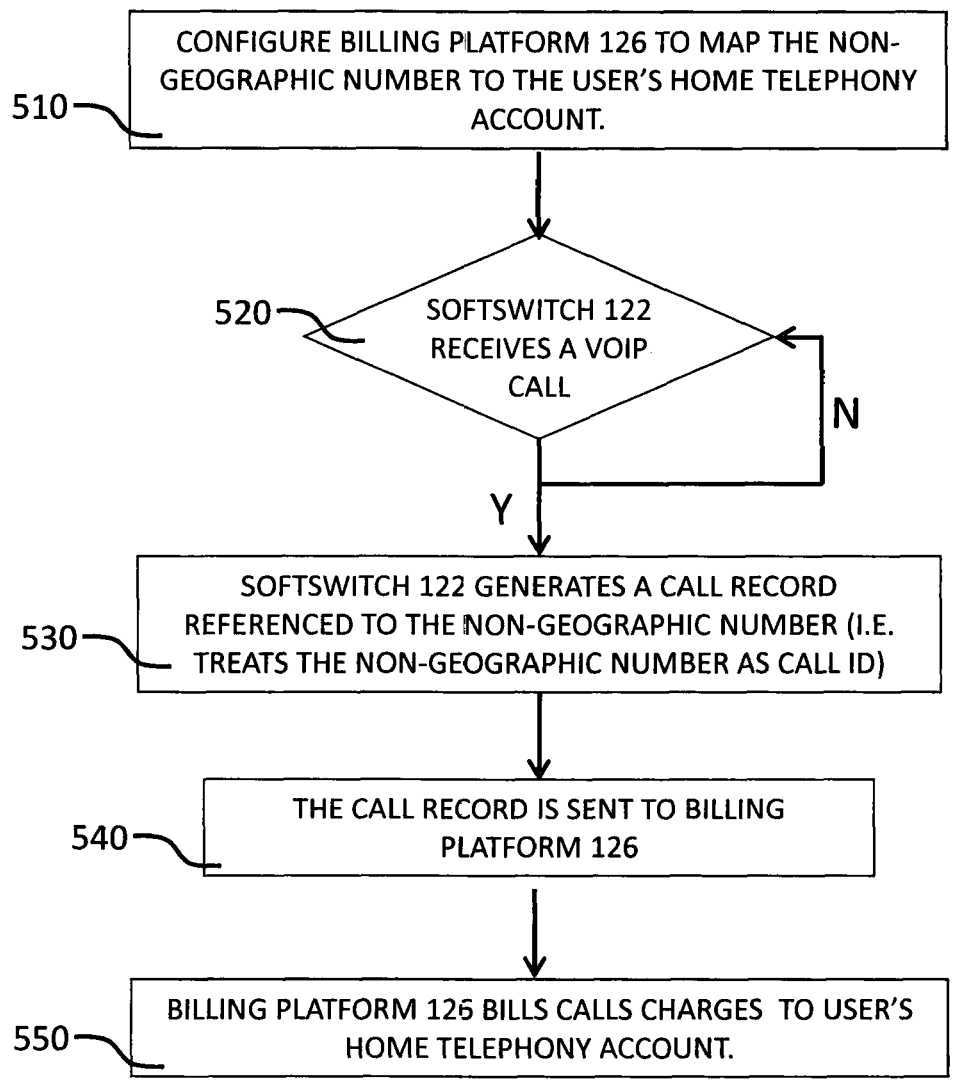

According to an embodiment, PSTN or other call charges in relation to the outgoing SIP/VoIP call may be billed to the user's home account. A logic flow according to an embodiment is shown at FIG. 5. At 510, billing platform 126 is configured to map the non-geographic number to the user's home telephony account. At 520, a SIP/VoIP call request is received at softswitch 122 and, in response at 530, a call record is generated by softswitch 122 referenced to the second identifier (i.e. softswitch 122 treats the non-geographic number as a call ID). At 540, the call record is sent to billing platform 126. At 550, call charges are then billed by billing platform 126 to user's home telephony account. This billing transfer mechanism makes no use of the presentation number (i.e. the mobile phone number), except that the presentation number may be shown on the bill to aid clarity.

The mobile user may already be registered with the home telephony service provider, for example, by virtue of a BT OneID account. If already registered, the user may extend the existing registration to the new service provided through the app by entering credentials (username and password) associated with the existing registration. The existing registration may, according to an embodiment, provide the user with controlled access to an existing service provided by the service provider (e.g. a home telephony service), however, this is not necessarily the case and, according to a further embodiment, the existing registration is not related to a current service. If the user does not have a suitable existing registration, they can request sign-up (i.e. so as to create a new account) in a manner that is described next.

Figure 2B:
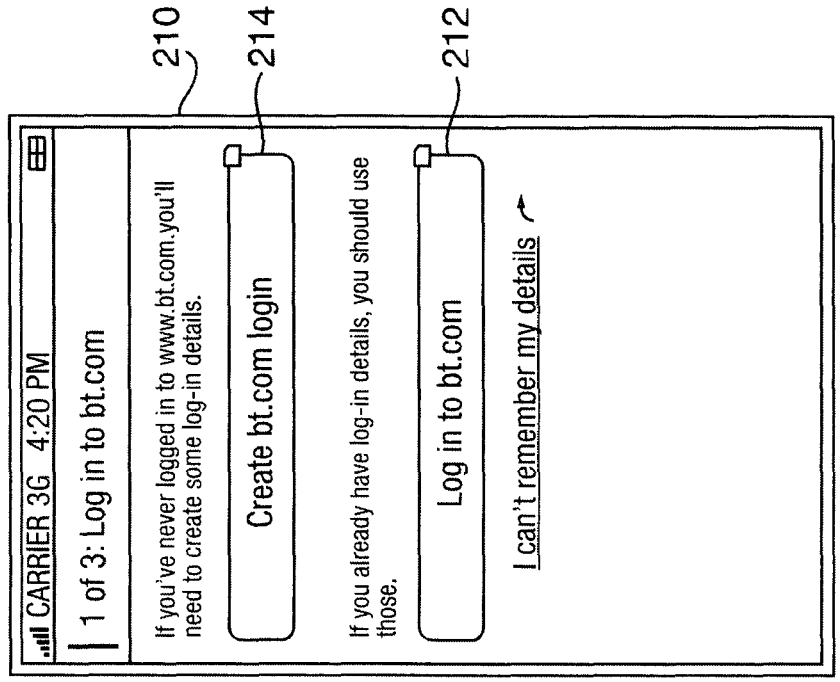
FIGS. 2a-2n show screens suitable for display on a mobile device operating according to an embodiment.
Figure 2A:
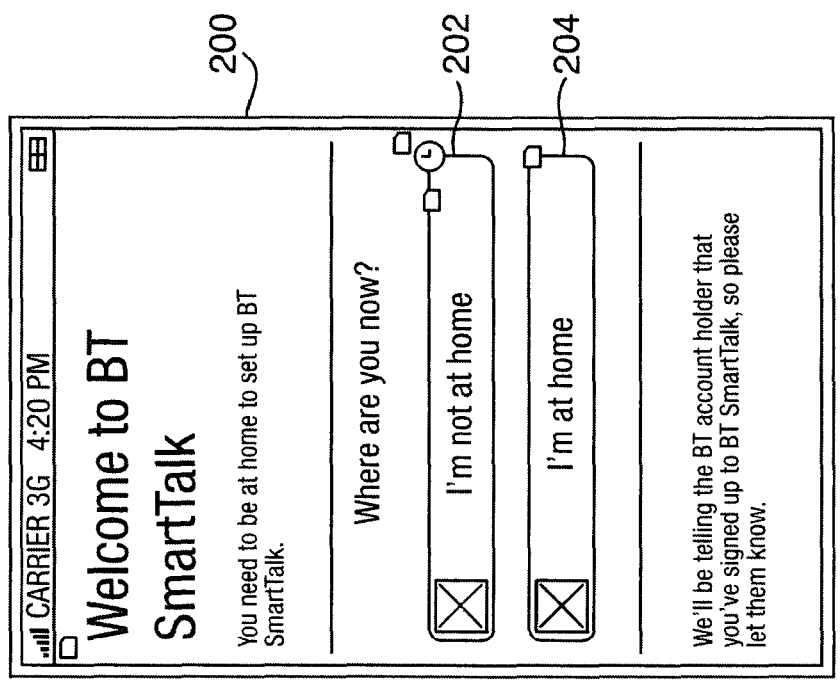
Figure 2H:
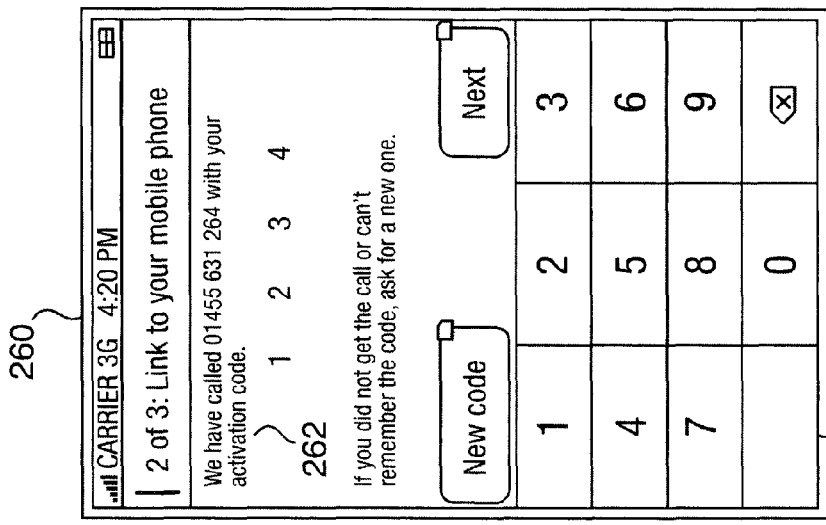
Figure 2G:
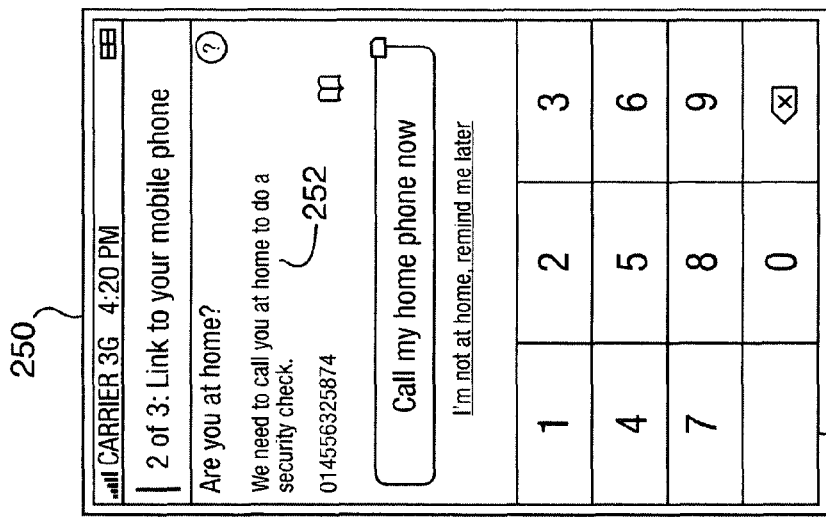
Figure 2F:
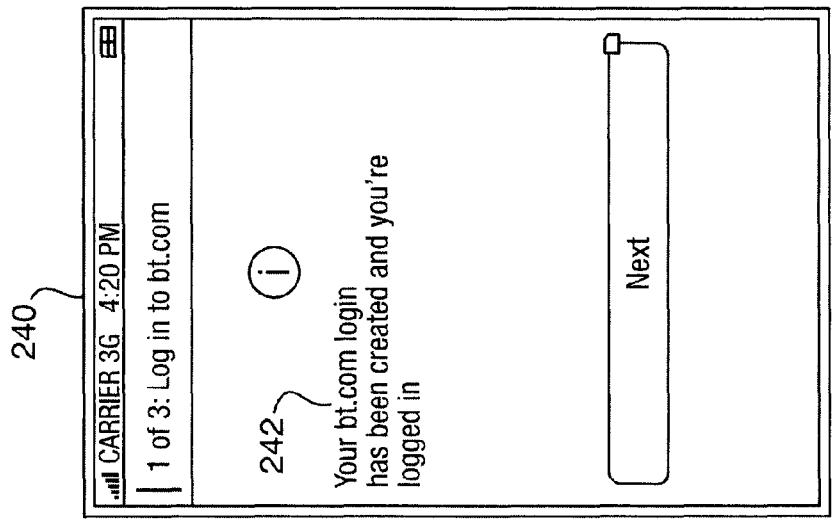
Figure 2N:
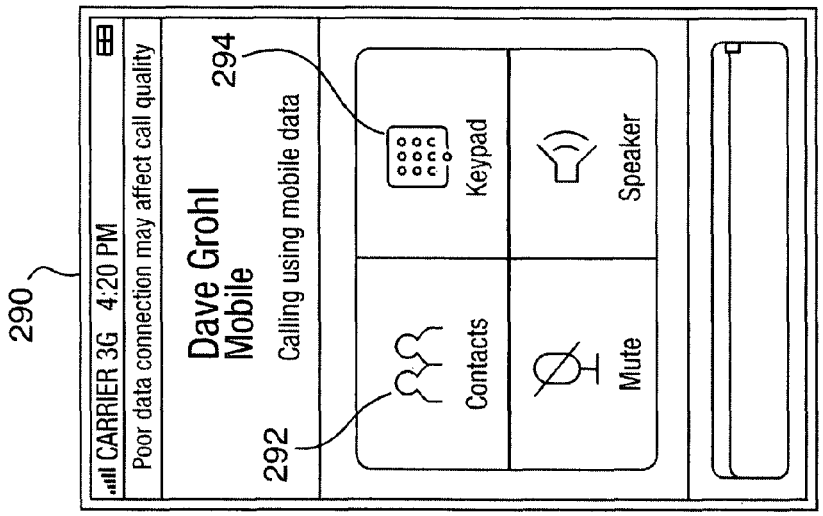

In the course of the registration journey, the app displays, to the user, a sequence of screens: as shown in FIGS. 2a to 2n. FIG. 2a show a welcome screen 200 for display on mobile device 100 at the start of the registration process. Welcome screen 200 comprises two user-selectable fields "I am not at home" 202 and "I am at home" 204 which, at the same time, prompt the user for input and provide a means for receiving input from the user. The user-selectable fields may be made to resemble buttons on which prompt text is displayed and where the mobile device is configured to detect selection of a user-selectable field either by the user touching the display in the region of the button (for touch-sensitive displays) or selecting the button with a pointing device (such as joystick or mouse) and operating an input control, such as a switch.

When mobile device 100 detects input from the user, it determines a subsequent step based on the input received as interpreted by operating and application software loaded on the device. When the user selects "I am not at home" 202, mobile device 100 may display an error screen (not shown) reminding the user that registration requires the user to have access to their home phone (for reasons that will become evident, later). When the user selects "I am at home" 204, mobile device 100 may display screen 210 to prompt the user, as shown in FIG. 2b, to indicate whether or not they have an existing billing account with a telephony service provider (for example BT) for their home telephony service. The prompt may take the form of two user-selectable fields, 212, 214, similar to those described above, with reference to FIG. 2a but displaying respective prompt text asking the user to login to an existing account (212) or to register (create a login) with the telephony service provider (214).

When the user selects "login" user-selectable field 212 on screen 210, mobile device 100 displays login screen 220 shown in FIG. 2c, requesting user login credentials. On login screen 220, the user is asked to input their user name and password associated with an existing billing account with the provider of their home telephony service.

In the alternative, when the user selects "create a login" user-selectable field 214 on screen 210, mobile device 100 displays screen 230 shown in FIGS. 2d and 2e, requesting user to register to create a login. FIGS. 2d and 2e represent a single, extended screen display 230, shown split into two parts in the drawings so as better to fit the page, whereas, when displayed on mobile device 100, this would appear as a single screen, albeit, one that may require the user to scroll down in order to view the whole content. FIGS. 2d and 2e show a series of empty fields, e.g. 232, 234, 236 with prompts for the user to enter information to support a request for a username and password associated with their home telephony service. Information to support the request may comprise personal details to enable the user to be identified.

On successfully logging in (or successfully creating a new login registration followed by a successful login) mobile device 100 displays screen 240 shown in FIG. 2f comprising text 242 to inform the user that login has been successful.

Where the user has requested to extend an existing registration (e.g. with the home telephony service provider), API Layer application 106 checks, with the existing service provider, the user's credentials provided as part of the sign-up process. If accepted, API Layer application 106 may prompt user via the app for an identifier of the home telephony account which is to be linked to their mobile communications service, e.g. a phone number associated with the home telephony service. FIG. 2g shows screen 250 comprising text 252 to prompt the use to enter, using on-screen keyboard 254, their home phone number. API Layer application 106 checks that the number entered by the user is (or relates to) a valid phone number (i.e. that there is a suitable account associated with the number). Alternatively, API Layer application 106 may compare the identifier with account details obtained directly from the home telephony service provider.

According to an embodiment, the mobile number and home telephony account number are checked to ensure that the user has access rights to both. If the number entered by the user on screen 250 is found to be valid, the equivalent home phone number may be called by API Layer application 106 via IVR platform 108. API Layer application 106 may provide a code (PIN1) via SMS (i.e. using telephony signaling over the mobile telephone connection supported by GSM network 112) to user's mobile device 100 together with appropriate instructions. FIG. 2k shows screen 270 with text 272 prompting the user to enter using on-screen keyboard 274, the PIN1 code provided over the user's mobile phone connection. When the user follows the instructions and enters the PIN1 code via the app, the app sends to API Layer application 106 (i.e. over a mobile telephone connection, supported by GSM network 112), the code entered by the user. API Layer application 106 checks the received code value against PIN1 code provided to mobile device 100—if the code received from the app matches PIN1 code provided to mobile device 100, API Layer application 106 verifies user's mobile phone number.

API Layer application 106 may provide a second code (PIN2) to the user in the course of the call (for example, by means of a computer-generated voice message) and prompts the user to enter the PIN2 code via the app on their mobile device 100. FIG. 2h shows screen 260 with text 262 prompting the user to enter, using on-screen keyboard 264, the PIN2 code provided over the user's home phone line. The app sends the code entered by the user to API Layer application 106 as a text (SMS) message. The text message is sent over a mobile telephone data connection, supported by mobile telephone network 112, such as a GSM network. API Layer application 106 checks the code received from mobile device 100, against the PIN2 code provided in the course of the call to home phone 110—if the code received from the app matches the PIN2 code provided to the home phone number, API Layer application 106 verifies user's home phone number.

Figure 2M:
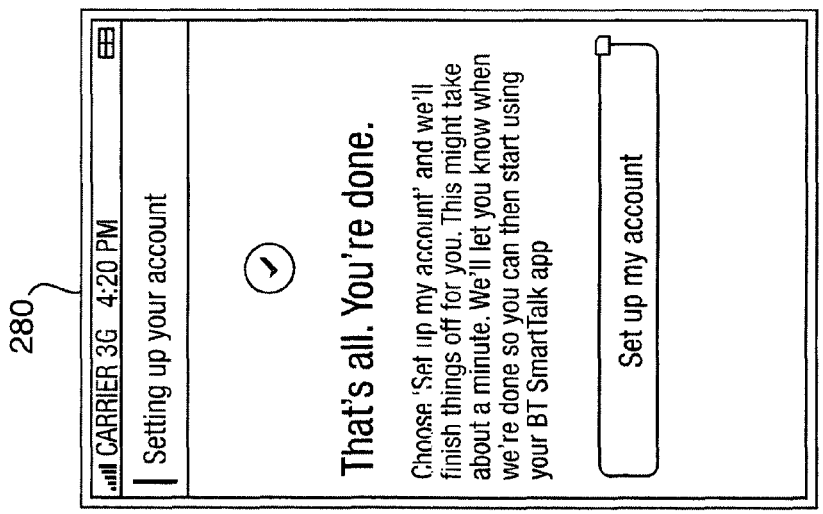
Figure 2K:
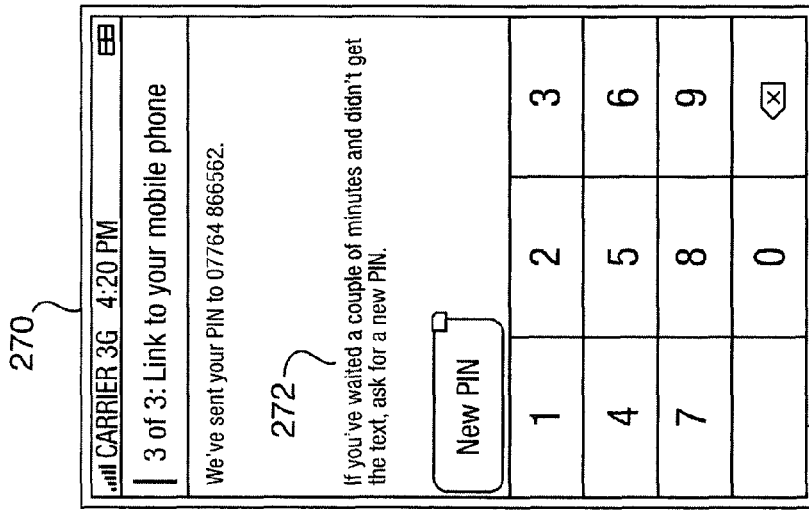

Having verified an identity for both the user's home phone 110 and mobile device 100, API Layer application 106 now initiates a back-end process to set up the account, while displaying further screen 280, as shown in FIG. 2m, confirming to the user that the system is now ready to associate their mobile device with their home telephony service billing account.

In order to initiate the back-end process to set up the account, API Layer application 106 hands control to customer order software function (MCSO 114). MCSO 114 serves as an aggregation and orchestration function for placing orders. MCSO 114 starts to build, on customer database server 116, a user profile for VoIP service for mobile device 100.

MCSO 114 makes a software call to phone number repository (MNUM) 118, requesting issue for the user's app of an unused non-geographic number (this non-geographic number will become an identifier for the newly created account). Typically, MNUM 118 provides operations for number selection and reservation, allocation, cancellation, number activation and cease. MNUM 118 allocates and provides a non-geographic number to MCSO 114 which stores the non-geographic number as part of the user profile on customer database server 116. MCSO 114 also copies the non-geographic number to Switch Manger 120 together with the customer's mobile number. Switch Manger 120 generates a password, which it associates with the non-geographic number, and provides the password together with the non-geographic number and the customer's mobile number to softswitch 122, such as the Softswitch from BT. A Softswitch is understood as a software controlled call server supporting multiple protocols and which implements message conversion from one signaling and addressing scheme to another, e.g., number translation.

Softswitch 122 sets up a SIP account for the non-geographic number (i.e. where the non-geographic number is the account ID and network number of the SIP account). Softswitch 122 then responds to Switch Manger 120 with a "success" message. Switch Manger 120 notifies the "success" message to MCSO 114 together with the non-geographic number and the password generated by Switch Manger 120. MCSO 114 appends an indication of the non-geographic number to the password and copies both to the user profile on customer database server 116. Customer database server 116 now has a record of the user's VoIP account SIP credentials (i.e. non-geographic number and SIP password).

Figure 3A:
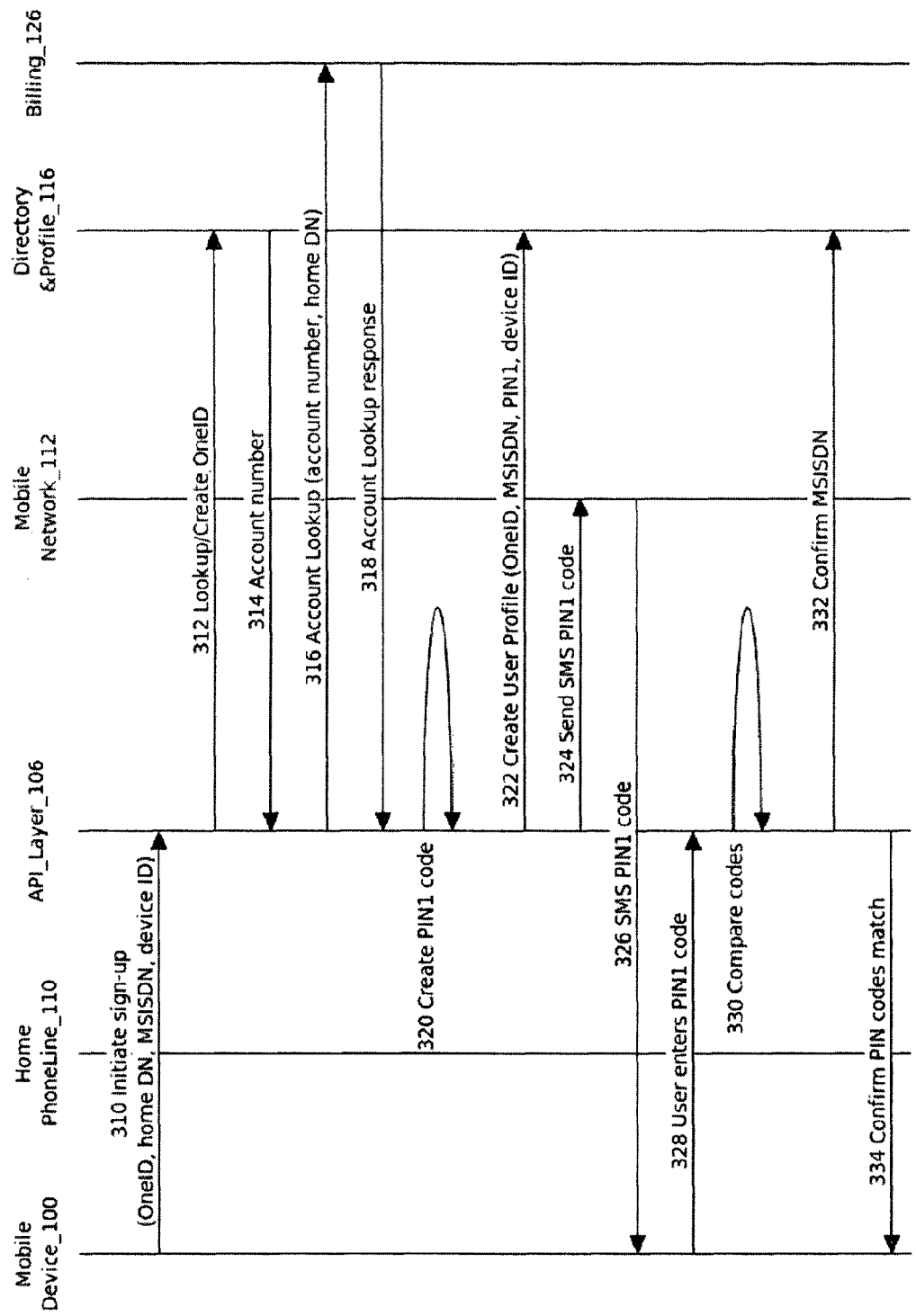
FIGS. 3a and 3b show a signal flow diagram according to an embodiment.

As shown in FIG. 3a at 310, mobile device 10 contacts API Layer application 106 to initiate sign-up and provides the following parameters: existing account ID (if available), home phone number (DN), mobile station international subscriber directory number (MSISDN) and device ID. MSISDN is used as an identifier for a mobile terminal device in a mobile communications network.

As shown in FIG. 3a at 312, API Layer application 106 contacts customer database server 116 to lookup existing user account (if available) or to request creation of a new account. At 314, customer database server 116 responds to API Layer application 106 providing the user's existing account number or newly-generated account number.

At 316, API Layer application 106 send a request to billing server 126 comprising the user's existing account number and home phone number (DN) to verify whether the user has a valid billing account. At 318, billing server 126 responds to the request from API Layer application 106.

At 320, API Layer application 106 creates PIN1 code. At 322, API Layer application 106 contacts customer database server 116 to request creation of a User Profile. The request comprises the user's existing account number, MSISDN, device ID and the PIN1 code.

As shown in FIG. 3a at 324, API Layer application 106 contacts mobile network 112 to send PIN1 code via SMS to mobile device 100. At 326, mobile network 112 contacts mobile device 100 via SMS with PIN1 code. The user then reads the code transmitted via SMS and enters it in the app running on mobile device 10. At 328, mobile device 10 sends the code entered by the user to API Layer application 106. At 330, API Layer application 106 compares the original PIN1 code with the code received from mobile device 100. As shown at 332 and 334 respectively, when the two codes match, API Layer application 106 contacts customer database server 116 to confirm the MSISDN and contacts mobile device 100 to confirm the code match.

Figure 3B:
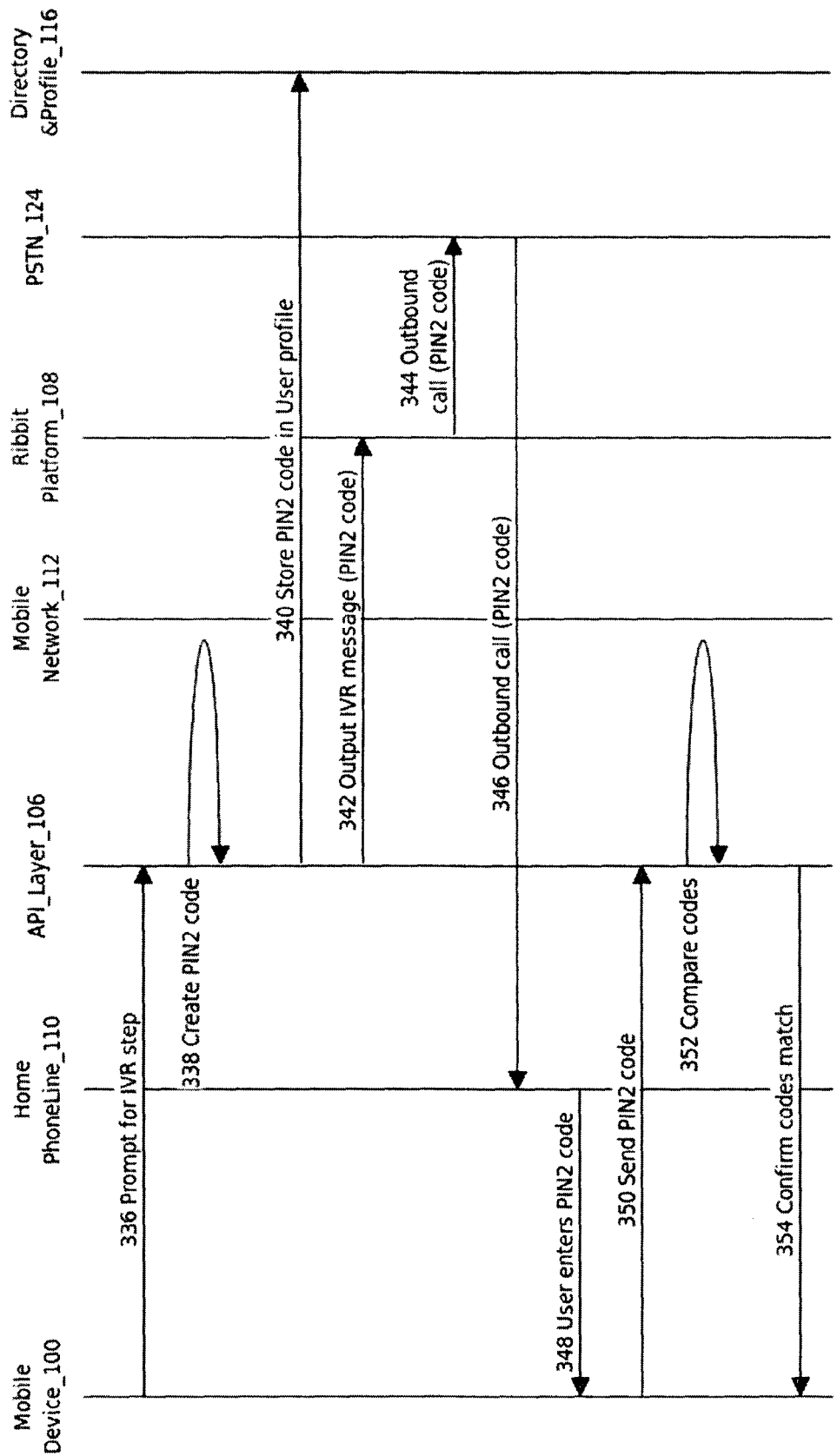

As shown in FIG. 3b (which continues the flow chart from FIG. 3a) at 336, mobile device 10 then contacts API Layer application 106 to prompt for a further code (PIN2) for verification of the home phone number. At 338, API Layer application 106 creates PIN2 code and, at 340, contacts customer database server 116 to store PIN2 code in the user profile. At 342, API Layer application 106 contacts IVR platform 108 to initiate output of an IVR message to communicate PIN2 code to home phone 110. At 344, IVR platform 108 contacts PSTN 124 to place an outbound call to home phone 110. At 346, PSTN 124 contacts home phone 110 to allow delivery of voice message comprising PIN2 code from IVR platform 108. At 348, the user obtains PIN2 code from home phone 110 and enters PIN2 code on the app running on mobile device 100. At 350, the app contacts API Layer application 106 to send the code entered by the user. At 352, API Layer application 106 compares the original PIN2 code with the code received from mobile device 100 and, at 354, contacts mobile device 100 to confirm that the codes match.

As described, above, once the app is installed on mobile phone 100, it starts to poll API Layer application 106 for user's SIP account credentials. Once these are available, API Layer application 106 copies the SIP credentials, which comprise the non-geographic number and SIP password, to the app, which now has all the data required to request set up of SIP calls via a data connection, e.g. VoIP calls, to softswitch 122 using the non-geographic number as mobile device 100 SIP line ID (i.e. caller or calling line identification (CLI)). In more detail, when MCSO 114 receives user's SIP account credentials they are stored on customer database server 116. Each poll from the app to API Layer application 106 results in a call from API Layer application 106 to customer database server 116 requesting the credentials. Once MCSO 114 has provided the credentials to customer database server 116, a poll from the app will result in them being copied from customer database server 116 to API Layer application 106 from where they are provided to the app. Polling by the app may occur before MCSO 114 has provided the credentials to customer database server 116, in which case, a poll will return no credentials and the app therefore knows to poll again.

User is now able to make outgoing SIP calls via a data connection via softswitch 122 for forwarding over the PSTN 124 or elsewhere. The mobile device app is now able to make VoIP calls to mobile numbers, landline numbers, SIP accounts, etc. FIG. 2n shows screen 290 for display on mobile device 100 representing the app in use making a voice call to a mobile number (although embodiments are not so limited but may support calls to landline numbers, SIP accounts, etc.). As shown in FIG. 2n, in use, the app may provide the user with access to a list of contact names and numbers 292, one of which may be selected to initiate a call, or alternatively a keypad 294 may be provided for entering a number to initiate a call.

Figure 4:
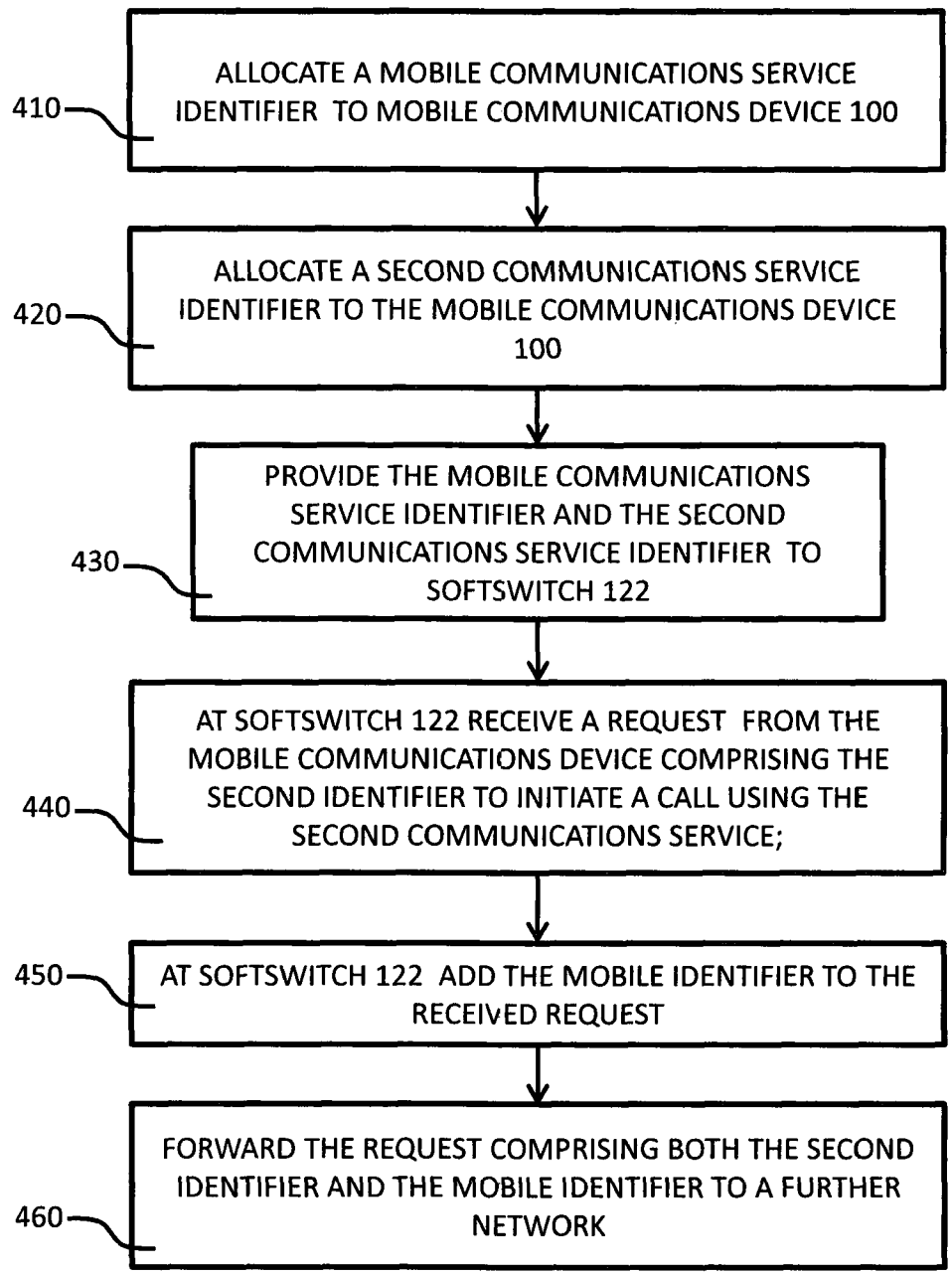
FIGS. 4 and 5 show logic flow diagrams according to embodiments.

A logic flow according to an embodiment is shown at FIG. 4. At 410, mobile communications device 100 is allocated an identifier (the "mobile identifier"), e.g. a mobile telephone number, for a mobile communications service provided by a mobile communications service provider. At 420, mobile communications device 100 is also allocated an identifier (the "second identifier") for a second communications service, e.g. a. UI for a SIP/VoIP communications service provided by a second communications service provider that may be different from the mobile communications service provider. At 430, switch manger 120 (optionally) generates a password, which it associates with the non-geographic number, and provides the password together with the non-geographic number and the customer's mobile number to softswitch 122. At 440, softswitch 122 receives from mobile device 100, a call request (SIP INVITE) comprising the second identifier. Softswitch 122 processes the call request in the normal way but, in addition, appends the mobile identifier to the received request. At 450 and 460, softswitch 122 responds to SIP call request received from user's mobile phone by setting-up an outgoing call request to the PSTN where the outgoing PSTN call set up request is associated with the second identifier and mobile identifier, e.g. the non-geographic number and the user's mobile number. According to an embodiment, the non-geographic number is carried in the request in a "P-Asserted-ID" field. According to an embodiment, the user's mobile number is carried in the request in a "FROM header" field. As a result, the mobile number will be available to the called user who will be able to use the mobile number to return the call and, possibly, identify the caller.

The above embodiments are to be understood as illustrative examples of the invention. Further embodiments are envisaged and will be evident to the skilled reader. It is to be understood that any feature described in relation to any one embodiment may be used in combination with one or more features of another of the embodiments, or any combination of the embodiments. Furthermore, equivalents and modifications not described above will be evident to the skilled reader and may also be employed without departing from the scope of the invention, which is defined in the accompanying claims.

As will be understood by those skilled in the art, embodiments may be implemented in computer program product software, any or all of which may be contained on various storage media so that the program can be loaded onto one or more computing devices (including the mobile devices, servers and switches described above) or downloaded over a computer network using a suitable transmission medium. The computer program product used to implement embodiments may be embodied on any suitable carrier, readable by a suitable computer input device, such computer program product may comprise semiconductor, magnetic or optically-readable media. Embodiments may be implemented by one or more hardware computing devices or systems having one or more processors and memory storing one or more programs that when executed by the one or more processors cause the computing devices to perform embodiments.

The invention claimed is:

1. A method for initiating a call in a communications system that comprises a mobile communications device connected in a mobile communications network, and the mobile communications device is allocated an identifier for a mobile communications service provided by a mobile communications service provider and a second identifier for a second communications service, the method comprising:
receiving, at a switch over a data connection from the mobile communications device, a request to initiate a call using the second communications service, wherein the received request comprises the second identifier;
adding, at the switch, the mobile identifier to the received request and forwarding via a further communications network, the request comprising both the second identifier and the mobile identifier; and
allocating to a billing account for a third communications service, a charge relating to the call using the second communications service,
wherein the mobile communications device is associated with a billing account for the mobile communications service.

2. The method of claim 1, wherein the second identifier is a non-geographic number.
3. The method of claim 1, further comprising forwarding the request via a PSTN.
4. The method of claim 1, further comprising forwarding the request via a mobile communications network.
5. The method of claim 1, wherein the second communications service is a SIP service.
6. The method of claim 1, wherein the second communications service is provided by a second communications service provider.
7. The method of claim 1, wherein the call comprises a VoIP call associated with a SIP line ID comprising the second identifier.
8. The method of claim 1, further comprising:
receiving, from the mobile communications device, a request to set up, with a third communications service provider, a billing account for the second communications service, wherein the request comprises information identifying an existing account with the third communications service provider;
allocating an identifier to the billing account with the third communications service provider; and
associating the identifier allocated to the billing account with the mobile communications device.
9. The method of claim 8, wherein the identifier allocated to the billing account comprises an unallocated non-geographic number.
10. A switch comprising:
a first communications interface for communicating over a data connection with a mobile communications device connected in a mobile communications network, wherein the mobile communications device is allocated an identifier for a mobile communications service provided by a mobile communications service provider and a second identifier for a second communications service, and wherein the mobile communications device is associated with a billing account for the mobile communications service;
a second communications interface for communicating with a further communications network; and
a processor configured to control operation of the switch to:
receive via the first communications interface, a request from the mobile communications device to initiate a call using the second communications service; in which the received request comprises the second identifier,
add the mobile identifier to the received request and forward, via the second communications interface to the further communications network, the request comprising both the second identifier and the mobile identifier, and
initiate allocation to a billing account for a third communications service, a charge relating to the call using the second communications service.
11. The switch of claim 10, wherein the second communications service is provided by a second communications service provider.
12. A communications system comprising the switch of claim 10.

* * * * *